June 23, 1953     L. J. RAINWATER     2,643,343
BALANCED DOUBLE IONIZATION CHAMBER X-RAY MONITOR
Filed May 5, 1950     2 Sheets-Sheet 1
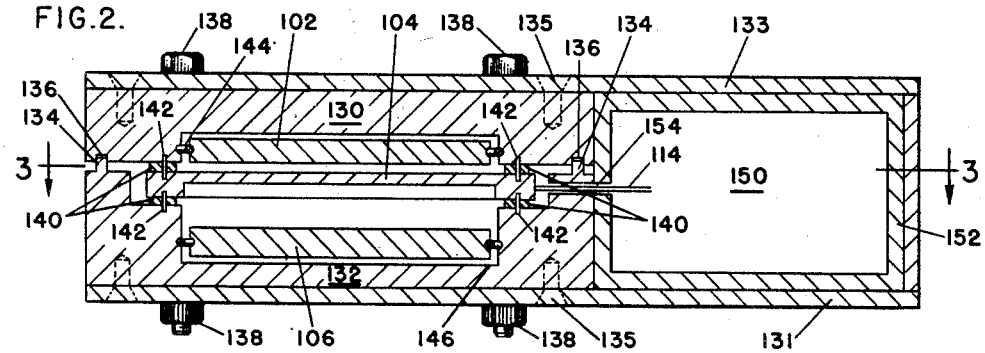
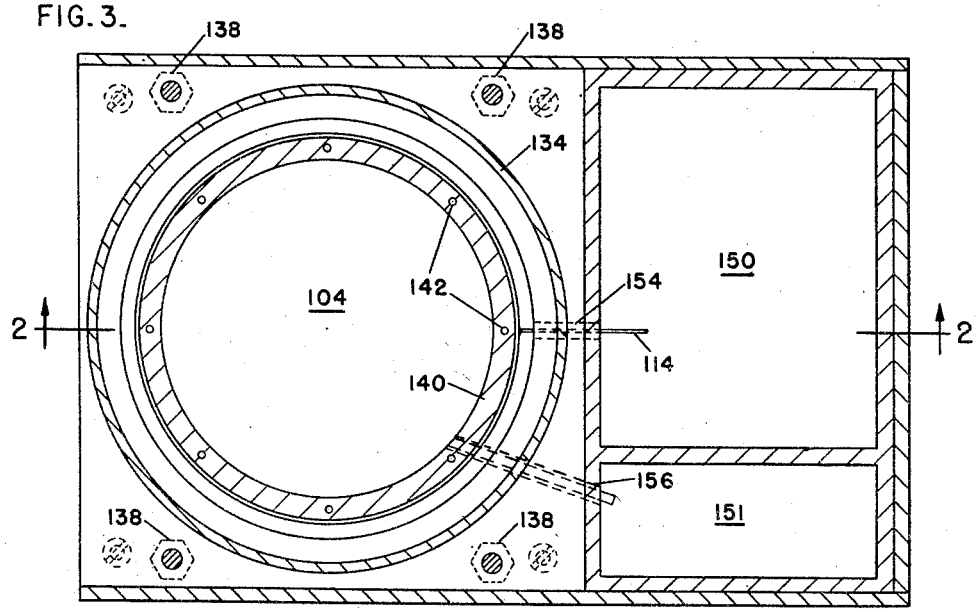
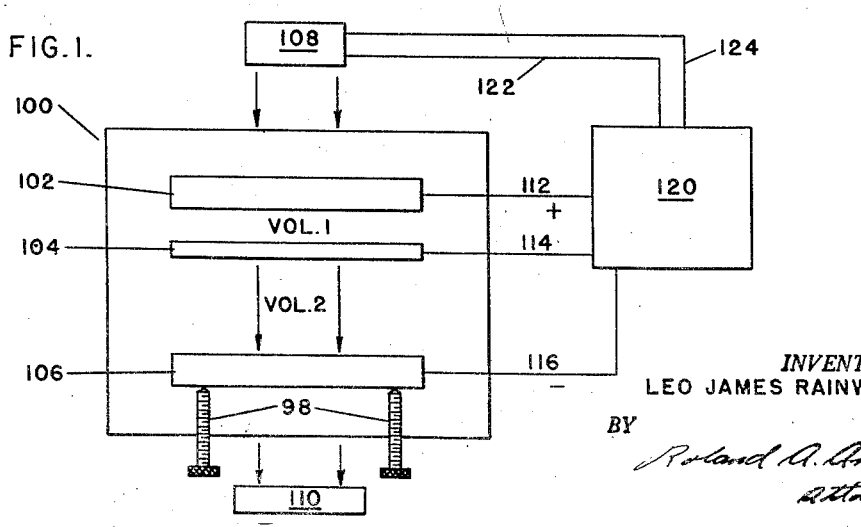
*INVENTOR.*
LEO JAMES RAINWATER

INVENTOR.
LEO JAMES RAINWATER

Patented June 23, 1953

2,643,343

UNITED STATES PATENT OFFICE 2,643,343

BALANCED DOUBLE IONIZATION CHAMBER X-RAY MONITOR

Leo James Rainwater, New York, N. Y., assignor to the United States of America as represented by the United States Atomic Energy Commission Application May 5, 1950, Serial No. 160,324

5 Claims. (Cl. 250—83.6)

The present invention relates to an apparatus for monitoring X-ray peak voltage.

It is frequently necessary to duplicate the X-ray intensity produced by a certain source within very close tolerances. This becomes necessary, for example, in analytical work with X-rays where the extent of absorption of X-rays is used to give an indication of the amount of a certain substance in a sealed container or the like. The intensity of X-rays emitted must be precisely duplicated from measurement to measurement if the results are to be compared.

There are two factors included in intensity measurements of X-rays. The first is the peak voltage, E, or the voltage applied between the electrodes to accelerate the X-ray producing electrons. The second is the cathode current, $i$, or the number of electrons which are accelerated between the electrodes. The value of the intensity, I, is directly proportional to the tube current $i$ and the control of $i$ does not cause a serious problem since it is easily adjusted and measured. If $i$ is kept constant and E, the peak voltage, is varied the variation of the intensity measurement, I, is much more rapid. For example, it has been found that with an E of approximately 124 kilovolts, I varies as E raised to the fifteenth power. Thus the main problem in maintaining constant source intensity reduces to one of maintaining E or the quality of the X-ray beam constant.

It is accordingly an object of the present invention to provide an apparatus suitable for measuring deviation from a certain intensity of X-rays in order to adjust their intensity to a certain value.

It is another object of the present invention to provide an apparatus capable of monitoring the intensity of X-rays produced from a tube with respect to a predetermined value.

It is still another object of the present invention to provide means which facilitate readjustment of the X-ray intensity at a given value after a lapse of time.

Other objects and advantages of the present invention will be in part obvious and in part pointed out hereinafter.

In one of its broader aspects the objects of the present invention may be achieved by providing a container divided by an ion collector plate into a large and a smaller ionization chamber, disposing conducting surfaces in confronting relation to the faces of said ion collector plate, impressing a voltage on the confronting surfaces to make the potential on the ion collector plate intermediate to the potential on the confronting surfaces, and to cause ion currents to flow from each confronting surface to said collector plate, and providing means for detecting the difference in ion current flowing to said collector plate.

Figure 1 is a schematic view of the essential components of the apparatus of the present invention.

Figure 2 is a sectional view of a chamber arrangement suitable for effecting the purposes of the present invention taken on a line 2—2 of Figure 3.

Figure 3 is a horizontal section of the chamber of Figure 2 taken on a line 3—3 of Figure 2.

Figure 4:
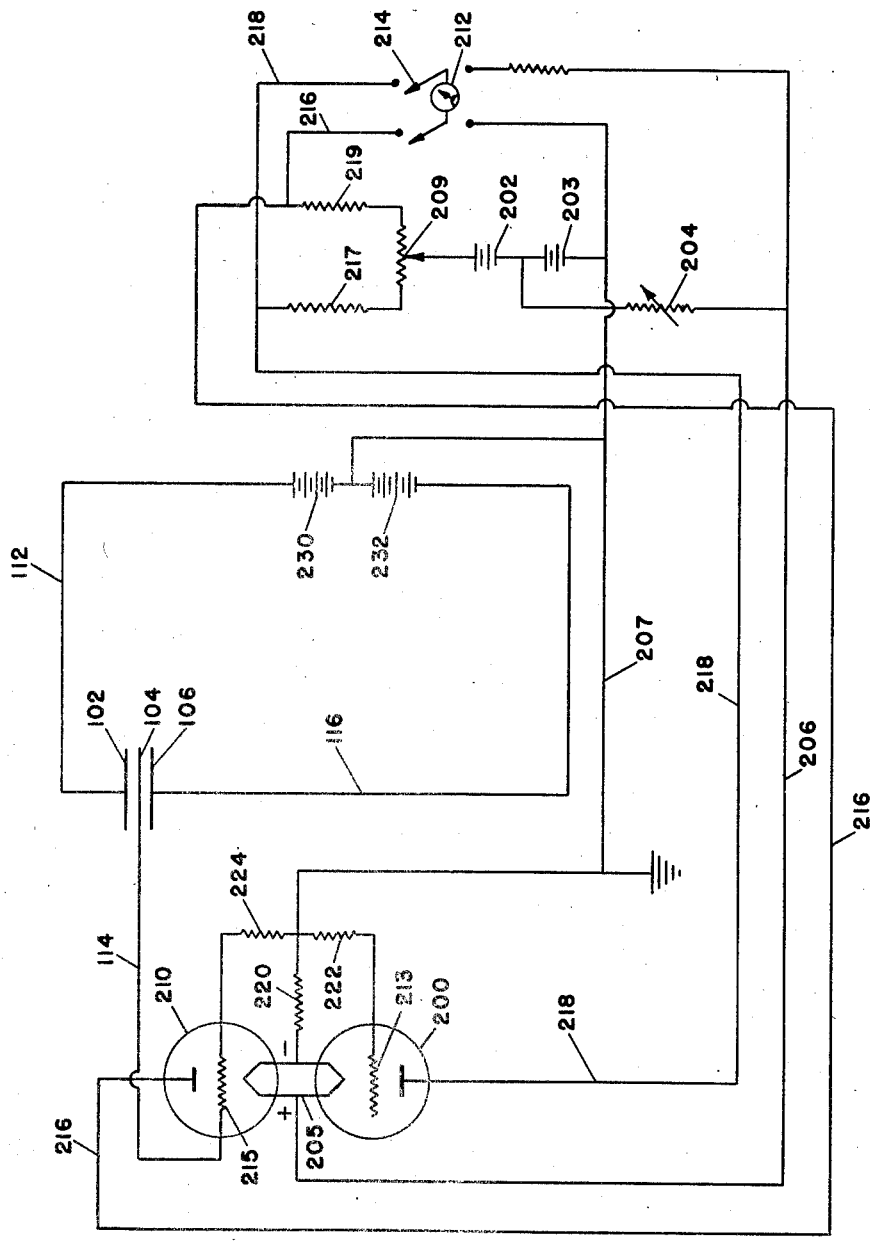
Figure 4 is a circuit diagram of the electrical system suitable for operating the present apparatus.

With reference particularly to Figure 1 a container 100 encloses three spaced parallel plates 102, 104, and 106. A source 108 of X-radiation is positioned with respect to the plates so as to emit X-radiation which passes through the plates in the direction normal thereto before passing toward an object 110. The plates 102, 104 and 106 are electrically connected respectively by the conductors 112, 114 and 116 in electrically insulated relation through the container 100 to the voltage supply and detector unit 120 discussed below with reference to Figure 4. Electrical connection may be made between the source 108 and the unit 120 through the electrical conductors 122 and 124 to regulate the source intensity in relation to a charge accumulated on the plate 104 as described below. This regulation is manual as described with reference to Figure 4.

The plate 102 is oppositely charged with respect to the plate 106 and the charge on plate 104 is intermediate to that on plates 102 and 106. For example, plate 102 may be positively charged with respect to plate 104 and the plate 106 negatively charged with respect to the plate 104. The radiation passing from the source 108 to the object 110 causes ionization of the gas within the chamber 100. The clearance between the plates 102 and 104 is smaller than the clearance between the plates 104 and 106. The relative clearance between the plates (indicated as volume 1 and volume 2) may be set at a desired value by adjustment of insulated screws 98 supporting the lower plate. If the intensity of radiation permeating the two volumes 1 and 2 were equal, a larger number of ions would be formed in volume 2 than in volume 1 because volume 2 contains more ionizable gas than volume 1. However, the intensity of radiation passing through volume 2 is relatively smaller than that passing through volume 1 because of the absorption of radiation by the plate 104. By adjusting the clearance between the plates (by means of screws 98 for example) it is possible to balance and just offset the difference in ionization occurring in the two volumes as a result of the absorption of radiation by plate 104. Plate 104 collects ions of both positive and negative charges from the two volumes because the plates 102 and 106 are oppositely charged with respect to the plate 104. If equal numbers of ions are formed in unit time in the two volumes the number of negative and positive ions collected on the plate 104 will be exactly equal and their charges will cancel. For one radiation intensity, therefore, no charge will collect on plate 104 and no current will flow to or from the plate 104. By connecting plate 104 through the conductor 114 to a very sensitive current indicating device, the voltage applied to the X-ray source 108 may be manually adjusted responsive to the presence or absence of a current flowing from the plate 104.

Reference is now made to Figures 2 and 3 wherein the details of a double ionization chamber, which has been found suitable for carrying out the present invention, are illustrated. The chamber is formed between the cover 130 and a base 132. The cover and base are composed of an insulating plastic material. The chamber may be hermetically sealed by disposing a gasket 136 into the peripheral groove in the under surface of cover 130, and by pressing the peripheral tongue 134, extending upwardly from the base 132, into contact with gasket 136. Upper and lower metal plates 133 and 131 are held to the external surfaces of plastic members 130 and 132 respectively by screws 135. A set of bolts 138 extending through the members 130 and 132 and the external plates 131 and 133 are employed to urge the tongue 134 into the peripheral groove in the cover 130.

Within the chamber enclosed between the members 130 and 132, three disc electrodes are disposed in insulated relation to each other. The central disc 104 is maintained in insulated spaced relation from the upper disc 102 and the lower disc 106. The separation between the discs is not equal, the separation between the central disc 104 and the lower disc 106 being appreciably greater than that between the central disc 104 and the upper disc 102. The lower portion of the disc 104 may be hollowed out as shown to increase the separation between the discs. Disc 104 is maintained in its centrally spaced position by the sets of annular gaskets 140. The gaskets 140 and disc 104 may be held in position by the pegs 142 which are disposed in holes in the plate 104, gaskets 140 and members 130 and 132. The upper plate 102 is held in position in the cover 130 by a snap ring 144 which fits into the conforming grooves in the confronting external and internal edges of the disc 102 and a depression in cover 130 respectively. A similar set of grooves and a snap ring 146 is provided for the base 106 to position it in the recessed portion of plate 132.

A chamber 150 containing detection apparatus, is provided adjacent the plate and disc assembly. This apparatus is described below with reference to Figure 4. The chamber 150 is surrounded by a protective shielding preferably of lead or similar heavy metal to minimize the amount of X-radiation penetrating the chamber 150 containing the instruments. Electrical connection is made between the electrical elements in the chamber 150 and plate 104 through the port 154. An auxiliary chamber 151 contains voltage supply means for supplying voltage to plates 102 and 106. Electrical connection is made between lower plate 106 and voltage supply means in chamber 151 through the port 156 in the base 132. A similar port in cover 130 permits electrical connection between plate 102 and the voltage supply in chamber 151.

The null point of the apparatus is the X-ray intensity for which the number of ions of opposite charge, being collected on the collector plate, just balances. Referring now to Figure 4, a detection circuit is shown which is suitable for use in conjunction with the balanced double ionization chamber described above to indicate the null point. The circuit consists of electrometer tubes 200 and 210, voltage supplies 202 and 203, voltmeter 212 and associated biasing and calibrating resistors. The filaments 205 of the electrometer tubes are connected in parallel and supplied with filament voltage from battery 203 by means of conductors 206 and 207. This filament voltage may be adjusted by means of variable resistor 204. When the filament voltage adjustment is made, the meter 212 is connected into this circuit by placing the switch 214 in the down position. After this it may be switched to the up position except when checking the filament voltage. Plate voltage is supplied to the electrometer tubes from battery 202 through plate resistors 217 and 219 and conductors 216 and 218. Potentiometer 209 may be used for properly dividing this voltage between the two tubes. Resistor 220 is common to both tubes and is in series with the filament supply of voltage. Bias voltage on grids 213 and 215 is obtained from the voltage drop across resistor 220 and resistors 222 and 224 respectively. Voltage is supplied to plates 102 and 106 respectively from batteries 230 and 232 through conductors 112 and 116.

The subject circuit is a standard two tube balanced circuit with common plate, filament and grid bias voltages. A high degree of balance can be obtained when voltmeter 212 is connected across conductors 216 and 218 by means of switch 214. Potentiometer 209 is varied until this meter reads zero. The plate voltage on the tubes has now been adjusted to exactly compensate for any differences in the tube characteristics or in the resistors that are not common to both tubes. Once this adjustment has been made, changes in the voltage supplies will not affect the meter reading as the change in one tube will cancel the effect of the change in the other.

The circuit can be unbalanced by a change in the voltage on grid 215 of tube 210. This grid is connected to collector electrode 104 by means of conductor 114. As the charge on this plate varies due to change of X-ray intensity, current will flow through resistor 224 to ground. Resistor 224 is a resistance in the order of $10^{10}$ ohms commonly used with electrometer tubes. The flow of current through this resistor will change the voltage on grid 215 and cause a change in the plate current flowing through tube 210. The voltage across plate resistor 219 will change thereby causing voltmeter 212 to change its reading. If it is desired to maintain constant X-ray intensity, adjustment may then be made in the apparatus producing the X-rays, to cause the meter to resume its original reading.

As one illustration of an operable form of the apparatus described above with reference to Figures 2 and 3 a brass plate having a thickness of approximately ¼ of an inch may be employed as the collector plate 104. An air gap of approximately 1/16 of an inch separates the plate 104 from the upper plate 102 and an air gap of approximately 7/24 of an inch separates the collector plate 104 from the lower electrode 106. A potential difference of approximately 90 volts is established between plates 102 and 104 and an equal potential difference is established between the plates 104 and 106 so that the voltage between plates 102 and 106 is 180 volts. With this voltage and in this configuration of the double ionization chamber it is found that a balanced condition or null point exists for a value of E equal to about 135 kilovolts. The existence of a balanced condition or null point is indicated by an absence of a current flowing to or from the collector plate 104 as indicated by a reading on meter 212. The sensitivity of the monitor to changes in E can be given almost any desired value by a choice of a suitably high input resistance. The sensitivity is proportional to the total X-ray intensity or the current $i$ in the X-ray tube. A 20 microampere meter may be used to observe changes of 0.1 microampere in the null settings. With an X-ray emission current $i$ of 1 milliampere and an input resistance of $10^{11}$ ohms, a change of 0.1 microampere in the output meter represents a change of 0.06 kilovolt or a 0.05 percent change in E. Greater sensitivity is readily obtainable by increasing the input resistance.

It is apparent from the foregoing description that a highly sensitive X-ray intensity monitor is provided by the present invention. It will be understood that the scope of the invention is not limited to the embodiments illustratively described above. Obviously the ionization chamber enclosure may be very substantially altered in so far as the shape, size and composition of its elements are concerned without departing from the scope of the present invention. In the particular embodiment illustratively described the housing of the ion current detecting apparatus is conveniently arranged in a lead lined chamber adjacent the double ionization chamber. However, it is apparent that this particular arrangement or the use of the ion current detecting circuit illustratively disclosed is not essential to the carrying out of the present invention. Substantially any null point detecting apparatus such as one which counterbalances the current flowing from a collector plate, similar to plate 104, with the aid of a null point electrometer, may be used in connection with the present invention. With regard to the double ionization chamber, substantially any conducting material may be used to form the plates 102, 104 and 106. The main criteria for the composition of plate 104 is that it be capable of absorbing sufficient X-rays to cause a change in the amount of ionization in the chambers between the plates. One way in which the null point of the apparatus may be varied is by variation of the material of which plate 104 is composed. Another method of varying the null point of the apparatus is by variation in the thickness of the collector plate used. Still a third manner in which the null point of the apparatus may be varied is by varying the separation between the plates. It is also possible to make minor adjustments in the X-ray intensity, if the composition and thickness of the collector plate and the separations between the plates are kept constant, by operating the chamber in such manner that a constant ion current flows to or from the collector plate as indicated by meter 212.

The variation in the collector plate composition or thickness may be made by substitution of one plate for another. The variation in the relative clearance between the plates may be made by adjustment of screws such as those shown in the schematic representation of the monitor in Figure 1. The voltage on the plates 102 and 106 are preferably kept very close to equal and opposite with respect to the plate 104. However, minor variations in this voltage do not result in excessive deviations in the collector plate current.

Since many embodiments might be made of the present invention and since many changes might be made in the embodiment described, it is to be understood that the foregoing description is to be interpreted as illustrative only and not in a limiting sense.

I claim:

1. An X-ray intensity monitor which comprises in combination a container divided by an ion collector plate into a larger and a smaller ionization chamber, two conducting surfaces disposed in said container in confronting relation to the faces of said ion collector plate, a source of X-radiation spaced from the monitor in a direction substantially normal to the plates thereof thereby to direct said radiation through both the larger and smaller chambers consecutively, a source of voltage, means for impressing the voltage on said conducting surfaces and means for detecting a change in the charge on said ion collector plate.

2. An X-ray intensity monitor which comprises in combination a container divided by an ion collector plate into a larger and a smaller ionization chamber, two conducting surfaces disposed in said container in confronting relation to the faces of said ion collector plate, a source of X-radiation spaced from the monitor in a direction substantially normal to the plates thereof thereby to direct said radiation through both the larger and smaller chambers consecutively, a source of voltage, means for impressing the voltage on said conducting surfaces so that the potential of the ion collector plate is intermediate between that impressed on the conducting surfaces and means for detecting a change in the charge on said ion collector plate.

3. An X-ray intensity monitor which comprises in combination a container divided by an ion collector plate into a larger and a smaller ionization chamber, two conducting surfaces disposed in said container in confronting relation to the faces of said ion collector plate, a source of X-radiation spaced from the monitor in a direction substantially normal to the plates thereof thereby to direct said radiation through both the larger and smaller chambers consecutively a source of voltage, means for impressing the voltage on said conducting surfaces to cause the potential of the ion collector plate to be intermediate between that impressed on the conducting surfaces, means for detecting a change in the charge on said ion collector plate and means for adjusting the separation between the faces of said collector plate and said confronting surfaces.

4. A radiation intensity monitor which comprises in combination an hermetically sealable container enclosing an ion collector plate and two additional plates, one of said additional plates confronting said ion collector plate on either side but spaced from said ion collector plate by different distances to form two ion chambers of different depths, a source of X-radiation spaced from the monitor in a direction substantially normal to the plates thereof thereby to direct said radiation through both the larger and smaller chambers consecutively a source of voltage, means for impressing equal and opposite voltage on the two outer plates and means for detecting the net ion current flowing to or from said ion collector plate.

5. A radiation intensity monitor which comprises in combination an hermetically sealable container enclosing an ion collector plate and two additional plates, said plates being circular and coaxial, one of said additional plates confronting said ion collector plate on either side but spaced from said ion collector plate by different distances to form two ion chambers of different depths, a source of X-radiation spaced from the monitor in a direction normal to the plates thereof thereby to direct said radiation through both the larger and smaller chambers consecutively a source of voltage, means for impressing equal and opposite voltage on the two outer plates and means for detecting the ion current flowing to or from said ion collector plate.

LEO JAMES RAINWATER.

References Cited in the file of this patent

UNITED STATES PATENTS

| Number | Name | Date |
|---|---|---|
| 2,383,820 | Rosenblum | Aug. 28, 1945 |
| 2,467,420 | Binneweg, Jr. | Apr. 19, 1949 |
| 2,473,827 | Spencer | June 21, 1949 |
| 2,487,216 | Blau et al. | Nov. 8, 1949 |
| 2,531,804 | Carlin et al. | Nov. 28, 1950 |

FOREIGN PATENTS

| Number | Country | Date |
|---|---|---|
| 319,202 | Germany | Apr. 14, 1918 |